US012634157B2

(12) United States Patent
Halper et al.

(10) Patent No.: US 12,634,157 B2
(45) Date of Patent: May 19, 2026

(54) METHOD FOR EXTENDING A PROOF OF SPACE BLOCKCHAIN

(71) Applicant: Chia Network Inc., San Francisco, CA (US)

(72) Inventors: Nicolas Halper, San Francisco, CA (US); Bram Cohen, San Francisco, CA (US)

(73) Assignee: Chia Network Inc., San Francisco, CA (US)

( * ) Notice: Subject to any disclaimer, the term of this patent is extended or adjusted under 35 U.S.C. 154(b) by 0 days.

(21) Appl. No.: 19/271,586

(22) Filed: Jul. 16, 2025

(65) Prior Publication Data

US 2026/0025287 A1 Jan. 22, 2026

Related U.S. Application Data

(60) Provisional application No. 63/717,638, filed on Nov. 7, 2024, provisional application No. 63/672,097, filed on Jul. 16, 2024.

(51) Int. Cl.
  H04L 29/06 (2006.01)
  H04L 9/00 (2022.01)
(52) U.S. Cl.
  CPC ..................................... H04L 9/50 (2022.05)
(58) Field of Classification Search
  USPC ....................................................... 713/193
  See application file for complete search history.

(56) References Cited

U.S. PATENT DOCUMENTS

| | | | | |
|---|---|---|---|---|
| 11,159,307 B2 * | 10/2021 | Bathen | .................. | H04L 9/3239 |
| 11,860,858 B1 * | 1/2024 | McKervey | ........... | H04L 9/3297 |
| 12,052,375 B2 * | 7/2024 | Agrawal | ............... | H04L 9/3271 |
| 12,399,913 B1 * | 8/2025 | Toulme | ................ | G06F 16/287 |
| 2017/0083907 A1 * | 3/2017 | McDonough | ...... | G06Q 20/3825 |
| 2018/0191503 A1 * | 7/2018 | Alwar | .................. | G06Q 20/065 |

(Continued)

OTHER PUBLICATIONS

Xie, Yankai et al. Private Transaction Retrieval for Lightweight Bitcoin Clients. IEEE Transactions on Services Computing, vol. 16, Issue: 5. https://ieeexplore.IEEE.org/stamp/stamp.jsp?tp=&arnumber=10168270 (Year: 2023).*

(Continued)

*Primary Examiner* — Jeremiah L Avery
(74) *Attorney, Agent, or Firm* — Run8 Patent Group, LLC; Peter Miller; Brian T. Chew

(57) ABSTRACT

A method includes: generating a set of output entries based on a set of initial entries; identifying a matching pair of entries in the set of output entries; generating a first forward-propagated entry in a second set of entries based on the first matching pair of entries; identifying a second matching pair of entries in the second set of entries; identifying a group of initial entries associated with the second matching pair of entries; extracting a subset of bits, in a set of target bits, from each initial entry in the group of initial entries; generating a second forward-propagated entry—representing a proof fragment—in a third set of entries in a third table by encrypting the set of target bits; generating a plot file representing a set of tables including the third table; and storing the plot file.

20 Claims, 4 Drawing Sheets

(56) References Cited

U.S. PATENT DOCUMENTS

| | | | |
|---|---|---|---|
| 2020/0084018 A1* | 3/2020 | Pande | H04L 9/0844 |
| 2020/0134066 A1* | 4/2020 | Yegorin | H04L 9/0637 |
| 2020/0401718 A1* | 12/2020 | Hennig | G06F 11/0727 |
| 2021/0266167 A1* | 8/2021 | Lohe | H04L 9/3213 |
| 2022/0027355 A1 | 1/2022 | Cohen et al. | |
| 2022/0116225 A1 | 4/2022 | Cohen et al. | |
| 2023/0281606 A1* | 9/2023 | Jakobsson | H04L 9/50 |
| | | | 705/67 |
| 2024/0214194 A1* | 6/2024 | Kapur | H04L 9/088 |

OTHER PUBLICATIONS

Nagy, Daniel A. et al. Symbol-Based Modeling and Coding of Block Markov Sources. IEEE Transactions on Information Theory, vol. 52, Issue: 12. https://ieeexplore.IEEE.org/stamp/stamp.jsp?tp=&arnumber=4016311 (Year: 2006).*

International Search Report and Written Opinion for International Application No. PCT/US25/37969 mailed on Sep. 29, 2025; 14 pages.

* cited by examiner

METHOD FOR EXTENDING A PROOF OF SPACE BLOCKCHAIN

CROSS-REFERENCE TO RELATED APPLICATIONS

This Application claims the benefit of U.S. Provisional Application No. 63/717,638, filed on 7 Nov. 2024, and U.S. Provisional Application No. 63/672,097, filed on 16 Jul. 2024, each of which is incorporated in its entirety by this reference.

This Application is related to U.S. patent application Ser. No. 17/320,114, filed on 13 May 2021 and now U.S. Pat. No. 11,507,569, which is incorporated in its entirety by this reference.

TECHNICAL FIELD

This invention relates generally to the field of cryptography and, more specifically, to a new and useful method for extending a proof of space blockchain within the field of cryptography.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Methods

Figure 1A:
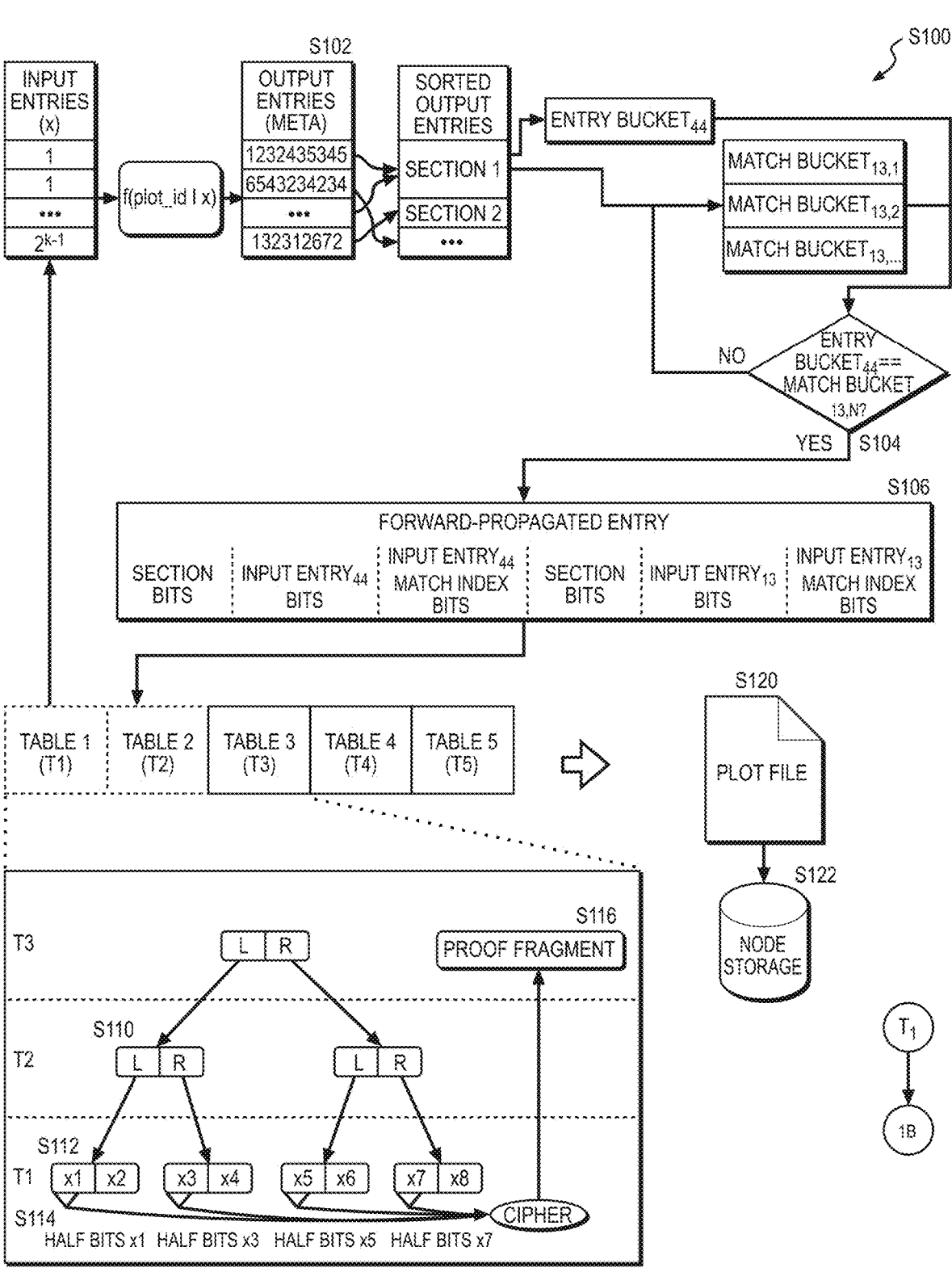
FIGS. 1A and 1B are flowchart representations of a method.
Figure 1B:
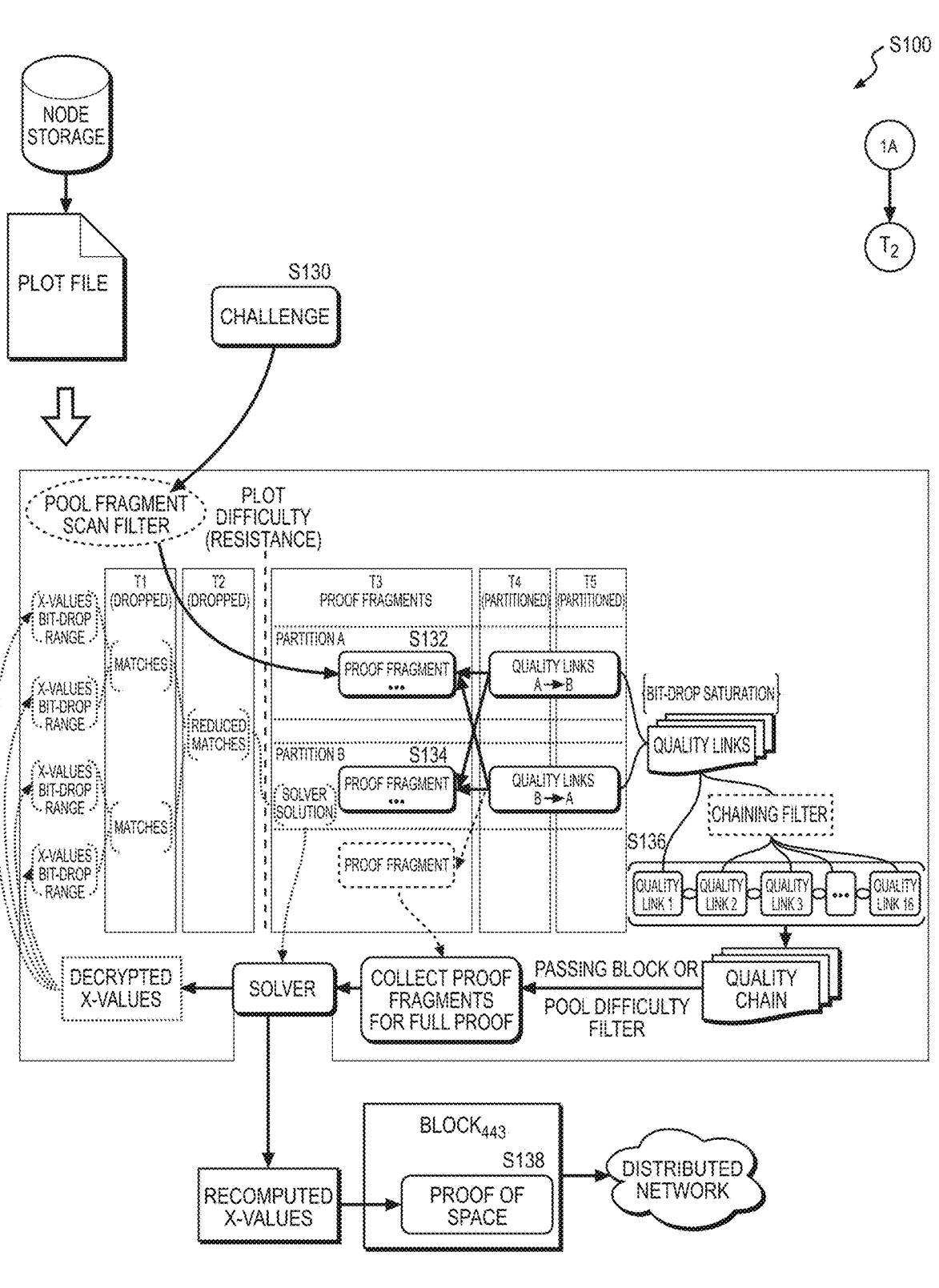

As shown in FIGS. 1A and 1B, a method S100 includes: generating a first set of entries based on a set of initial entries in a first table via a first deterministic function and a seed value in Step S102; identifying a first matching pair of entries in the first set of entries in Step S104; generating a first forward-propagated entry in a second set of entries in a second table based on the first matching pair of entries in Step S106; identifying a second matching pair of entries in the second set of entries in Step S110; identifying a group of initial entries, in the set of initial entries, associated with the second matching pair of entries in Step S112; extracting a subset of bits, in a set of target bits, from each initial entry in the group of initial entries in Step S114; and generating a second forward-propagated entry in a third set of entries in a third table by encrypting the set of target bits in Step S116. The second forward-propagated entry represents a first proof fragment in a set of proof fragments.

The method S100 also includes: generating a plot file representing a set of tables including the third table in Step S120; storing the plot file in a storage device in Step S122; accessing a proof-of-space challenge in Step S130; and generating a proof of space based on the proof-of-space challenge and the set of proof fragments in the plot file in Step S138.

1.1 Variation: Quality Links

Figure 3:
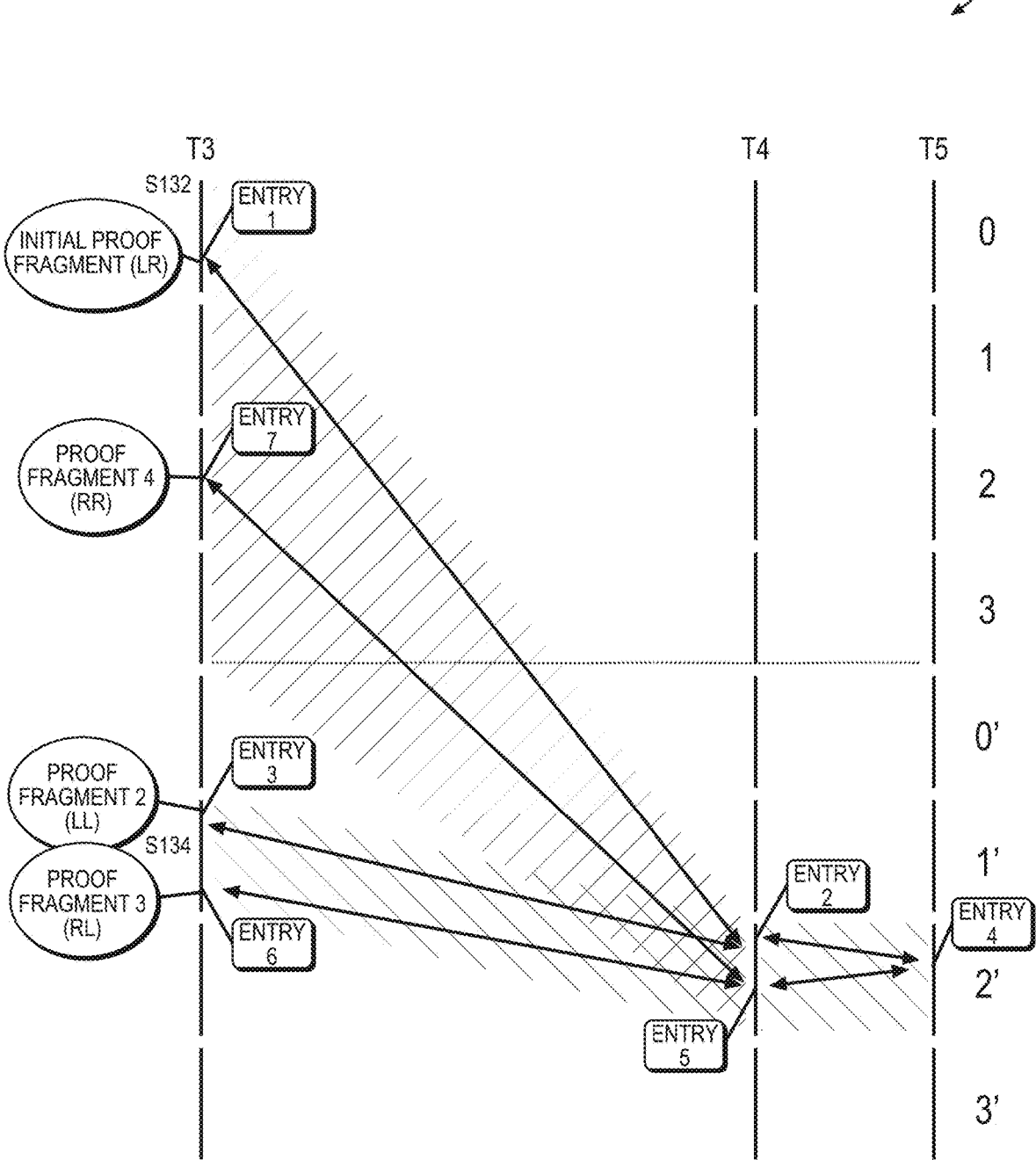
FIG. 3 is a flowchart representation of one variation of the method.

As shown in FIGS. 1A, 1B, and 3, one variation of the method S100 includes: generating a first set of entries based on a set of initial entries in a first table via a first deterministic function and a seed value in Step S102; identifying a first matching pair of entries in the first set of entries in Step S104; generating a first forward-propagated entry in a second set of entries in a second table based on the first matching pair of entries in Step S106; identifying a second matching pair of entries in the second set of entries in Step S110; identifying a group of initial entries, in the set of initial entries, associated with the second matching pair of entries in Step S112; extracting a subset of bits, in a set of target bits, from each initial entry in the group of initial entries in Step S114; and generating a second forward-propagated entry in a third set of entries in a third table by encrypting the set of target bits in Step S116. The second forward-propagated entry represents a first proof fragment in a set of proof fragments.

This variation of the method S100 also includes: generating a plot file representing a set of tables including the third table in Step S120; accessing a proof-of-space challenge specifying a target range of values in Step S130; identifying an initial proof fragment, in the set of proof fragments, characterized by a value within the target range of values in Step S132; and identifying a first subgroup of proof fragments based on the initial proof fragment in Step S134. The subgroup of proof fragments includes: the initial proof fragment; and a pair of proof fragments, in the set of proof fragments, associated with the initial proof fragment.

This variation of the method S100 further includes: generating an initial quality link, in a series of quality links, representing the first subgroup of proof fragments in Step S136; and generating a proof of space responsive to the proof-of-space challenge based on the series of quality links in Step S138.

1.2 Variation: Plot File

As shown in FIGS. 1A and 1B, one variation of the method S100 includes: generating a first set of entries based on a set of initial entries in a first table via a first deterministic function and a seed value in Step S102; identifying a first matching pair of entries in the first set of entries in Step S104; generating a first forward-propagated entry in a second set of entries in a second table based on the first matching pair of entries in Step S106; identifying a second matching pair of entries in the second set of entries in Step S110; identifying a group of initial entries, in the set of initial entries, associated with the second matching pair of entries in Step S112; extracting a subset of bits, in a set of target bits, from each initial entry in the group of initial entries in Step S114; and generating a second forward-propagated entry in a third set of entries in a third table by encrypting the set of target bits in Step S116. The second forward-propagated entry represents a first proof fragment in a set of proof fragments.

This variation of the method S100 also includes: generating a plot file representing a set of tables including the third table in Step S120; and storing the plot file in a storage device in Step S122.

1.3 Variation: Matching Condition

As shown in FIGS. 1A and 1B, a method S100 includes, during a first time period at a node in a distributed network:

generating a first table, in a series of tables, including a first set of initial entries; generating a first set of output entries based on the first set of initial entries and a deterministic function and a plot seed in Step S102; sorting the first set of output entries into a first sorted set of output entries; and segmenting the first sorted set of output entries into a set of sections, each section in the set of sections including a subset of output entries in the first set of output entries.

The method S100 also includes, for each section in the set sections: generating a set of entry buckets based on the subset of output entries; generating a set of match buckets for each output entry in the subset of output entries based on a quantity of match index bits in an output entry; and identifying a set of matches between entry buckets in the set of entry buckets and match buckets in the set of match buckets.

The method S100 further includes, for each match in the set of matches between an entry bucket and a match bucket: identifying a first output entry in the first set of output entries associated with the entry bucket; identifying a first input entry in the first set of input entries corresponding to the first output entry; identifying a second output entry in the first set of output entries associated with the match bucket; identifying a second input entry in the first set of input entries corresponding to the second output entry; generating a forward-propagated entry based on the first input entry and the second input entry in Step S106; and storing the forward-propagated entry in a second table in the series of tables.

The method S100 also includes: generating a plot file representing the series of tables in Step S120; and storing the plot file in a storage device in Step S122.

1.4 Variation: Beneš Compression

Figure 2:
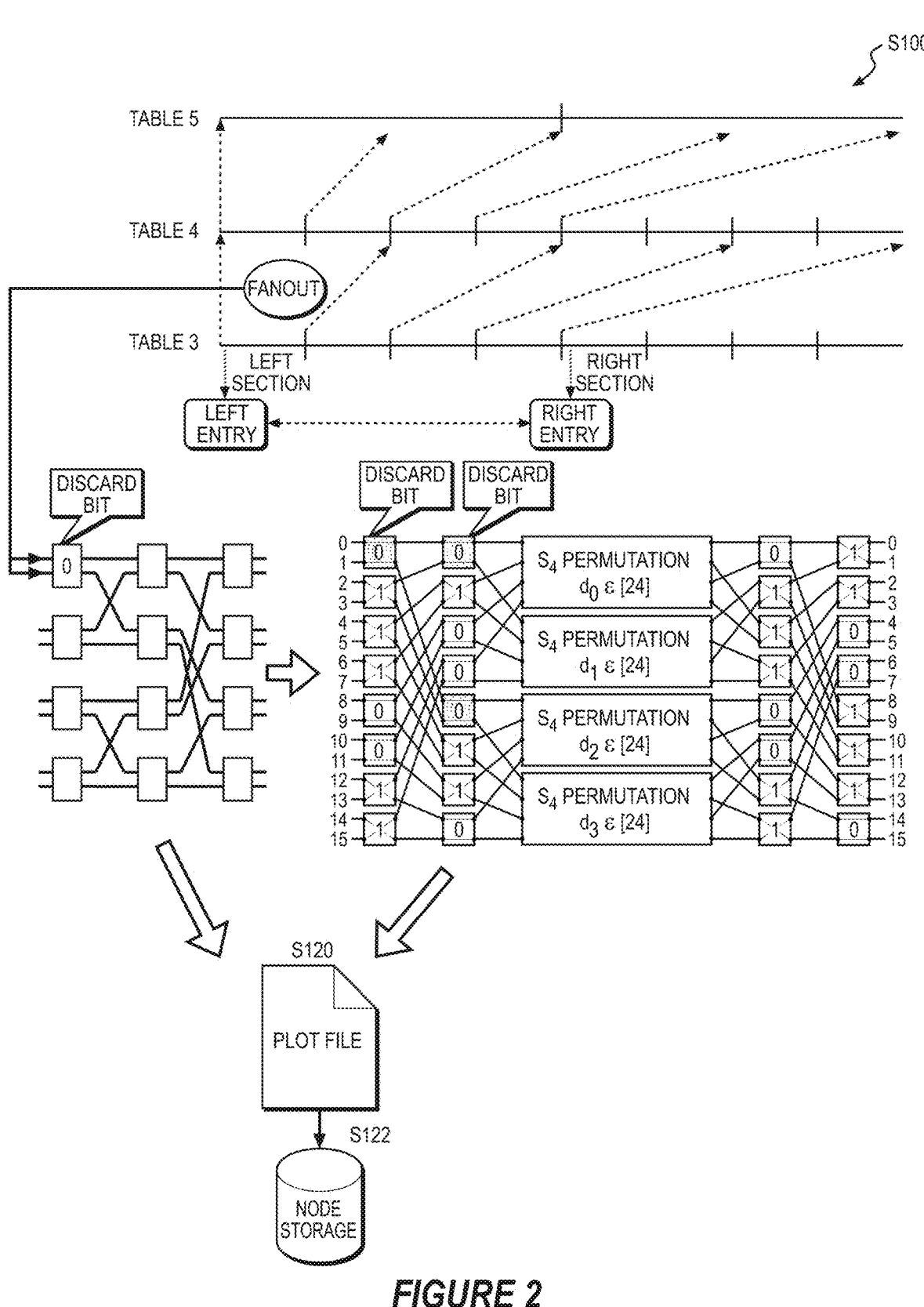
FIG. 2 is a flowchart representation of one variation of the method.

As shown in FIG. 2, one variation of the method S100 further includes: defining a set of edges connecting a set of entries in the second table to entries in a third table in the series of tables; accessing a first set of bits representing a first edge in the set of edges; and encoding the first set of bits into a first permutation, in a set of permutations, in a Beneš network for the second table. The first permutation exhibits a second quantity of bits falling below a first quantity of bits in the first set of bits.

This variation of the method S100 also includes storing the set of permutations associated with the Beneš network and representing the set of edges.

2. Applications

Generally, a system including a node (e.g., a computing device)—in a distributed network of nodes—can execute Steps of the method S100: to generate a plot file representing proofs of space; to store the plot file in the node; to access a challenge for generating a proof of space associated with a next block of the blockchain; to generate the proof of space based on the plot file and responsive to the challenge; to validate the plot file and/or the proof of space, such as based on a scan filter for the plot file and/or a quality of the proof of space; to generate the next block based on the proof of space in response to validating the plot file and/or the proof of space; and to broadcast the next block to the distributed network of nodes. Therefore, the node can execute Steps of the method S100 to cryptographically "prove" allocation of storage in the node via the plot file in order to generate and append the next block to the blockchain.

More specifically, the system can execute Steps of the method S100: to generate a first table—in a series of tables—including a set of initial values (or "x-values"); to recursively pair and match initial values represented in entries in a target table in the series of tables; and to generate new entries (or "forward-propagated entries") in a succeeding table in the series of tables in order to generate a proof of space representing a binary tree of these initial values.

For example, the system can execute Steps of the method S100: to identify a matching pair of entries in a second table in the series of tables; to identify a group of initial values (e.g., four pairs of x-values, eight x-values) associated with the matching pair of entries; to selectively extract subsets of target bits from the group of initial values; to assemble these subsets of target bits into a set of target bits representing a set of "bit-dropped" initial values (or "bit-dropped" x-values); to encrypt the set of target bits into a "proof fragment"; and to generate an entry—in a third table in the series of tables—representing the proof fragment.

Therefore, by generating a proof fragment based on the set of "bit-dropped" initial values (rather than complete initial values, or complete "x-values"), the system can reduce a storage footprint of the plot file and increase a quantity of computations to recompute complete initial values from "bit-dropped" initial values, thereby: enabling an honest node to store a greater quantity of proofs of space (e.g., a plot file characterized by a larger size); reducing effectiveness of rental attacks by malicious nodes; and increasing security of the distributed network.

Then, the system can execute Steps of the method S100: to access a proof-of-space challenge specifying a target range of values; to identify an initial proof fragment within the target range of values; to identify a subgroup of proof fragments—associated with the initial proof fragment—by traversing a binary tree represented in the series of tables; to generate an initial quality link in a set of quality links based on the subgroup of proof fragments; to iteratively and selectively append quality links to the initial quality link in order to form a series of quality links (or a "quality chain") that passes a series of filters (e.g., hash filters, a quality filter); to retrieve an additional (remaining) proof fragment for each quality link in the series of quality links; to decrypt proof fragments associated with the series of quality links into sets of target bits (or sets of "bit-dropped" x-values); to recompute (or reconstruct) these sets of target bits into a set of initial values (or a set of complete x-values); and to generate a proof of space based on the set of initial values.

Therefore, by implementing reconstruction of "bit-dropped" x-values into complete x-values, the system can greatly increase a computational cost for a malicious node by achieving bit drop saturation where the computational cost for reconstruction of the "bit-dropped" x-values into the complete x-values exceeds a computational cost to generate a new plot file (or a "full plot grind"), thereby: reducing effectiveness of rental attacks by malicious nodes; and increasing security of the distributed network.

2.1 Matching Condition

Additionally, the system can execute Steps of the method S100: to generate a first table—in a series of tables—including a set of initial values (or "x-values"); to generate a set of output values (or "meta values") based on the set of initial values, a plot identifier associated with the node, and a deterministic function (e.g., a pseudorandom function); to detect a quantity of match index bits associated with an output value; to sort and segment the set of output values into sections; to generate a set of entry buckets for the set of output values; and to generate a set of match buckets for output values in the set of output values based on the quantity of match index bits. The node can then execute Steps of the method S100: to attempt to match a target entry bucket—for a target output value in the set of output values—with match buckets corresponding to each other output value in the set of output values.

In response to detection of a match (e.g., equivalence, correspondence) between the target entry bucket and a target match bucket, the system can execute Steps of the method S100: to identify a first pair of initial values (e.g., a first pair of x-values) corresponding to the target entry bucket; to identify a second pair of initial values (e.g., a second pair of x-values) corresponding to the target match bucket; to generate an entry (e.g., a forward-propagated entry) representing the first pair of initial values and the second pair of initial values; to encrypt the entry into an encrypted entry; and to store the encrypted entry in a succeeding table (e.g., a second table) in the series of tables.

Therefore, the system can tune the quantity of match index bits in an output value in order to control a quantity of computations (or a "difficulty") to generate the plot file, thereby: reducing effectiveness of compression attacks and/or rental attacks by malicious nodes; and increasing security of the distributed network.

2.2 Beneš Compression

Furthermore, the system can execute Steps of the method S100: to generate a graph defining edges connecting entries in a target table to another table(s) (e.g., a preceding table, a succeeding) in the series of tables; encoding a set of permutations in a Beneš network representing these edges; to detect a subset of removable bits (e.g., Waksman bits) in the set of permutations based on a structure of the Beneš network; and to discard the subset of bits from the set of permutations in order to store a compressed representation of the graph absent loss of information for reconstructing the edges, thereby reducing a storage footprint (e.g., approximately 1.44 bits per entry) of the plot file.

The system can repeat these Steps of the method S100 to generate a Beneš network for each table in the series of tables.

Therefore, by generating a Beneš network for each table in the series of tables, the system can execute Steps of the method S100 to traverse the series of tables in a plot file in an ascending direction and/or in a descending direction in order to reduce a completion time for generating a proof of space.

3. Terminology

Generally, a "blockchain object" (e.g., a coin, token, a singleton) is referred to herein as a representation of state within a block of a blockchain.

Generally, a "node" is referred to herein as a computing device configured to: validate transactions for inclusion in a block of a blockchain; generate the block including validated transactions; and append the block to the blockchain.

Generally, a "mempool" is referred to herein as a collection of pending transactions stored (e.g., in memory) by a node (and/or by a set of nodes) for confirmation and inclusion in a block of the blockchain.

Generally, a "plot file" is referred to herein as a data structure defining a set of proofs-of-space.

Generally, a "plot seed" is referred to herein as a value representing a seed to deterministically generate a plot file.

Generally, a "cryptographic hash function" is referred to herein as a one-way deterministic function that maps data to a bit array of a fixed size.

Generally, a "challenge" is referred to herein as a cryptographic hash value (e.g., a 256-bit hash value) based on a preceding (e.g., a most recent) block of the blockchain.

4. Blockchain Structure

Generally, a computer system can include a distributed network including nodes (e.g., computing devices) interconnected through a communication medium (e.g., the Internet, a wide area network, a local area network). Each node in the distributed network can: store a copy of a decentralized database (or "blockchain"); and execute a trustless consensus protocol associated with a state of the decentralized database. The distributed network can include a set of nodes configured to execute the consensus protocol to extend a blockchain (e.g., a proof of space-based blockchain).

A blockchain can include a data structure including a series of blocks. A block can include a set of transactions between addresses representing entities. For example, the set of transactions can include cryptocurrency transactions and/or smart contracts that enforce specific node behavior.

In one implementation, the set of nodes generates and adds new blocks to the blockchain. For example, the set of nodes can generate and add new blocks to the blockchain based on a proof of space.

4.1 Proof of Space

Generally, a node can generate a proof of space that is responsive to a challenge according to a most recent block (e.g., a canonical block) of the blockchain.

More specifically, the node can: store a plot file in the data storage device of the node; maintain a transaction buffer (hereinafter the "mempool") of pending transactions communicated over the distributed network; receive a challenge based on the most recent block of the blockchain; retrieve a proof of space (e.g., a series of tuples from the plot file) that confirms presence of the plot file in the data storage device and that is responsive to the challenge; and generate a block based on the proof of space and including a set of transactions from the transaction buffer.

Therefore, the node can cryptographically prove allocation of storage in order to append the block to the blockchain.

5. Plot Generation

The method S100 includes: generating a first set of entries based on a set of initial entries in a first table via a first deterministic function and a seed value in Step S102; identifying a first matching pair of entries in the first set of entries in Step S104; and generating a first forward-propagated entry in a second set of entries in a second table based on the first matching pair of entries in Step S106.

The method S100 includes: identifying a second matching pair of entries in the second set of entries in Step S110; identifying a group of initial entries, in the set of initial entries, associated with the second matching pair of matching entries in Step S112; extracting a subset of bits, in a set of target bits, from each initial entry in the group of initial entries in Step S114; and generating a second forward-propagated entry in a third set of entries in a third table by encrypting the set of target bits in Step S116. The second forward-propagated entry represents a first proof fragment in a set of proof fragments.

The method S100 includes: generating a plot file representing a set of tables including the third table in Step S120; and storing the plot file in a storage device in Step S122.

Generally—in Steps S102, S104, S016, S110, S112, S114, S116, and S120, and as shown in FIGS. 1A and 1B—a node can: allocate an amount of storage—for generating proofsof-space—in a data storage device; generate a plot file characterized by the amount of storage; and store the plot file in the data storage device.

More specifically, the node can generate a plot file including a series of tables (e.g., three tables, five tables) representing proofs-of-space. Additionally, the node can generate the plot file associated with the node, such as via a cryptographic key (e.g., a public-private key pair) associated with the node.

The node can: generate a first table including a set of initial entries; generate a set of output entries (or a "first set of entries") based on the set of initial entries via a deterministic function and a seed value (e.g., a plot identifier or a "plot seed") in Step S102; and identify matches between pairs of output entries in the set of output entries based on a matching condition in Step S104.

In response to identifying a match between a pair of output entries in the set of output entries, the node can: access a group of input entries (e.g., a pair of input entries) in the set of input entries and associated with the pair of output entries; generate a forward-propagated entry based on the group of input entries and a deterministic function (e.g., a cypher, a cryptographic hash function) in Step S106; and store the forward-propagated entry in a succeeding table (e.g., a second table) in the series of tables.

The node can repeat the foregoing methods and techniques for each matching pair of output entries in the set of output entries: to access a group of input entries in the set of input entries and associated with the matching pair of output entries; to generate a forward-propagated entry based on the group of input entries and a deterministic function; and to store the forward-propagated entry in the succeeding table (e.g., a second table) in the series of tables in order to generate a set of forward-propagated entries in the succeeding table.

For each table (e.g., a third table) in the series of tables, the node can execute the foregoing methods and techniques: to identify matching pairs of entries (e.g., forward-propagated entries derived from entries in a preceding table, such as the second table) in the table in Step S110; to access a group of input entries (e.g., a quartet of input entries) in the first set of input entries and corresponding to the matching pair of entries in Step S112; to generate a new forward-propagated entry based on the group of input entries and a deterministic function in Step S116; and to store the new forward-propagated entry in a succeeding table (e.g., a fourth table) in the series of tables.

Therefore, the node can forward-propagate a set of entries from a preceding table to a succeeding table, each entry in a table corresponding (e.g., based on a deterministic function and a matching condition) to two entries in a preceding table and traceable to initial entries in the first table.

5.1 First Table

In one implementation, the node generates a first table in the series of tables. The first table includes a set of initial entries. Each initial entry in the set of initial entries includes a pair of values (hereinafter "x-values"). Each x-value is characterized as an integer between 0 and $2^k$, where k (e.g., $30 \leq k \leq 50$) represents a space parameter. Each x-value is characterized by a length of k bits.

For example, the node can: set a space parameter to 32 (e.g., k=32); and generate a first table including a set of initial entries characterized by a quantity of $2^{32}$ entries (i.e., $2^k$ entries). Each entry in the first set of initial entries includes a pair of 32-bit x-values.

5.2 Second Table

In another implementation, in Step S102, the node generates a set of output entries (or a "first set of entries") based on the set of initial entries via a deterministic function (e.g., a pseudorandom function) and a seed value (e.g., a plot seed).

More specifically, for each initial entry in the set of initial entries, the node can generate an output entry in the set of output entries based on the deterministic function and the seed value.

In another implementation, the node: sorts (e.g., in ascending order) the set of output entries into a sorted set of output entries; and segments the sorted set of output entries into a set of sections. For example, the node can segment the sorted set of output entries into 64 sections in response to detection of the space parameter corresponding to 32 (e.g., k=32). Each section in the set of sections includes a subset of output entries in the set of output entries.

In this implementation, for each section in the set of sections, the node: accesses the subset of output entries in the section; generates a set of entry buckets based on the subset of output entries; generates a set of match buckets for each output entry in the subset of output entries; and identifies a set of matches between entry buckets and match buckets.

For each match in the set of matches between an entry bucket and a match bucket, the node: identifies a first input entry corresponding to a first output entry based on which the entry bucket is generated; identifies a second input entry corresponding to a second output entry based on which the match bucket is generated; generates a forward-propagated entry based on the first input entry and the second input entry; and stores the forward-propagated entry in the second table.

Therefore, by segmenting the set of output entries into sections and identifying matches between entry buckets and match buckets within each section, the node can completely load the section into memory in order to reduce a quantity of memory operations, thereby reducing a total completion time for generating the plot file.

5.2.1 Matching Condition

Generally, the node can evaluate a matching condition on each pair of entries in a table by identifying that the pair of entries correspond to associated buckets, such as an entry bucket associated with a first entry in the pair of entries matched with a match bucket associated with a second entry in the pair of entries. For example, the node can define a bucket size (or a quantity of buckets) over the space of possible entry values that corresponds to a statistically predicted number of matches sufficient to generate a succeeding table.

In one implementation, the node: segments the sorted set of output entries into the set of sections including a first section including a first subset of output entries; and generates a first set of entry buckets based on the first subset of entries.

More specifically, for each output entry in the first subset of output entries, the node generates an entry bucket in the first set of entry buckets based on the output entry and a deterministic function (e.g., a cryptographic hash function). Each entry bucket in the first set of entry buckets includes a set of bits including: a first subset of bits representing a section to which the output entry belongs; a second subset of bits representing a subsection to which the output entry belongs; and a third subset of bits representing a match index (or a "match key").

In one variation, because each output entry in the first subset of output entries corresponds to the first section, the node generates an entry bucket in the first set of entry buckets, excluding the first subset of bits representing the section to which the output entry belongs.

In another implementation, the node generates a set of match buckets for entries in the first subset of entries. Each entry in the first subset of entries is characterized by a quantity of bits (e.g., seven bits) in the third subset of bits representing the match index (or "match index bits," "match key bits").

In this implementation, the node detects the quantity of bits in the third subset of bits representing the match index. For each output entry in the first subset of output entries, the node generates a subset of match buckets—in the set of match buckets—based on the quantity of match index bits. More specifically, the node generates a match bucket for an output entry in the first subset of output entries based on the output entry, a match index, and a deterministic function (e.g., a cryptographic hash function).

For example, for a first output entry in the first subset of output entries, the node can generate a first subset of match buckets—in the set of match buckets—including 128 buckets (e.g., $2^7$ buckets) in response to detection of seven match index bits in the third subset of bits.

In another implementation, the node identifies a match between a target entry bucket, in the first set of entry buckets, and a target match bucket in the set of match buckets.

For example, for a first output entry in the first subset of output entries, the node: accesses a first entry bucket, in the first set of entry buckets, corresponding to the first output entry; accesses a first match bucket—in the set of match buckets—corresponding to a second output entry in the first subset of output entries; and compares the first entry bucket to the first match bucket.

In response to detection of a match between the first entry bucket and the first match bucket, the node: generates a filter value based on the first output entry, the second output entry, and a deterministic function (e.g., a cryptographic hash function); and detects a match between the first output entry and the second output entry in response to the filter value passing a hash filter.

In response to detection of the match between the first output entry and the second output entry, the node: identifies a first initial entry in the set of initial entries and corresponding to the first output entry; identifies a second input entry in the set of initial entries and corresponding to the second output entry; generates a first forward-propagated entry based on the first input entry and the second input entry; and stores the first forward-propagated entry in the second table.

For example, the node can generate the first forward-propagated entry including a 48-bit value characterized by: a first subset of bits (e.g., six bits) representing the first section; a second subset of bits (e.g., seven bits) representing a first match index corresponding to the first input entry (e.g., a first match index corresponding to a first x-value $x_1$ in the first input entry); a third subset of bits (e.g., seven bits) representing a second match index corresponding to the second input entry (e.g., a second match index corresponding to a third x-value $x_3$ in the second input entry); a fourth subset of bits corresponding to the first input entry, such as a first group of seven bits corresponding to the first x-value $x_1$ and a second group of seven bits corresponding to a second x-value $x_2$ in the first input entry; and a fifth subset of bits corresponding to the second input entry, such as a third group of seven bits corresponding to the third x-value $x_3$ and a fourth group of seven bits corresponding to a fourth x-value $x_4$ in the second input entry.

In this example, the node can omit (or discard, "drop") nineteen bits from each 32-bit x-value $x_1$, $x_2$, $x_3$, $x_4$.

More specifically, the node can generate the first forward-propagated entry including a left side entry and a right side entry. The left side entry is characterized by: the first subset of bits representing the first section; the second subset of bits representing the first match index corresponding to the first input entry; and the fourth subset of bits corresponding to the first input entry. The right side entry is characterized by: the first subset of bits representing the first section; the third subset of bits representing the second match index corresponding to the second input entry; and the fifth subset of bits corresponding to the second input entry.

The node can repeat the foregoing methods and techniques for each match bucket—corresponding to an output entry in the first subset of output entries—in the first set of match buckets: to compare the first entry bucket to the match bucket; to generate a filter value based on the output entry in response to detection of a match between the first entry bucket and the match bucket; to generate a filter value based on the first output entry, the output entry, and a deterministic function (e.g., a cryptographic hash function); to detect a match between the first output entry and the output entry in response to the filter value passing the hash filter; to identify the first initial entry corresponding to the first output entry; to identify a target initial entry in the set of initial entries and corresponding to the output entry; to generate a forward-propagated entry based on the first initial entry and the target initial entry; and to store the forward-propagated entry in the second table.

The node can repeat the foregoing methods and techniques for each output entry in the first subset of output entries to generate a subset of forward-propagated entries based on the first subset of output entries corresponding to the first section.

The node can repeat the foregoing methods and techniques for each section in the set of sections to generate (and store) a set of forward-propagated entries in the second table.

5.2.2 Encrypted X-Values

In one implementation, for each forward-propagated entry in the set of forward-propagated entries, the node: accesses a plot identifier associated with the node; and encrypts the forward-propagated entry based on a deterministic function (e.g., a cypher, a cryptographic hash function) and the plot identifier into an encrypted forward-propagated entry in a set of encrypted forward-propagated entries.

In this implementation, the node stores the set of encrypted forward-propagated entries in the second table. Additionally, the node can sort (e.g., in ascending order) the set of encrypted forward-propagated entries in the second table.

5.3 Additional Tables

Generally, the node can repeat the foregoing methods and techniques for each table (e.g., a third table) in the series of tables: to identify a matching pair(s) of forward-propagated entries (derived from entries in a preceding table, such as the second table) in the table; to access a pair of initial entries in the set of initial entries and corresponding to the matching pair of forward-propagated entries; to generate a new forward-propagated entry based on the pair of initial entries and a deterministic function; and to store the new forward-propagated entry in a succeeding table (e.g., a fourth table) in the series of tables. Additionally, for each table in the series of tables, the node can sort (e.g., in ascending order) entries in the table.

In one implementation, the node discards the first table and/or the second table from the series of tables.

For example, the node can discard the first table and/or the second table from the series of tables in response to generating the final table in the series of tables.

5.3.1 Proof Fragments

In one implementation, the node executes the foregoing methods and techniques: to generate a second set of entries (e.g., the set of encrypted forward-propagated entries) in the second table in the series of tables; and to identify matching pairs of entries—such as a first matching pair of entries—in the second set of entries.

In this implementation, the node: identifies a first group of initial entries (e.g., four initial entries)—in the set of initial entries—associated with the first matching pair of entries in Step S112; extracts a subset of bits, in a first set of target bits, from each initial entry in the group of initial entries in Step S114; and generates a forward-propagated entry in a third set of entries in a third table based on the first set of target bits in Step S116.

For example, the node can identify the first group of initial entries including: a first initial entry; a second initial entry; a third initial entry; and a fourth initial entry. The first initial entry represents: a first x-value $x_1$; and a second x-value $x_2$. The second initial entry represents: a third x-value $x_3$; and a fourth x-value $x_4$. The third initial entry represents: a fifth x-value $x_5$; and a sixth x-value $x_6$. The fourth initial entry represents: a seventh x-value $x_7$; and an eighth x-value $x_8$.

In this example, the node can: extract a first subset of bits (e.g., a first half of bits, a first match index for the first x-value $x_1$) from a first set of bits representing the first x-value $x_1$; extract a second subset of bits (e.g., a first half of bits, a third match index for the third x-value $x_3$) from a third set of bits representing the third x-value $x_3$; extract a third subset of bits (e.g., a first half of bits, a fifth match index for the fifth x-value $x_5$) from a fifth set of bits representing the fifth x-value $x_5$; and extract a fourth subset of bits (e.g., a first half of bits, a seventh match index for the seventh x-value $x_7$) from a seventh set of bits representing the seventh x-value $x_7$.

More specifically, the node can selectively exclude (or omit, "drop") subsets of bits—in the first set of bits, the third set of bits, the fifth set of bits, and/or the seventh set of bits—from the first set of target bits.

Additionally, the node can selectively exclude (or omit, "drop") a second set of bits representing the second x-value $x_2$, a fourth set of bits representing the fourth x-value $x_4$, a sixth set of bits representing the sixth x-value $x_6$, and/or an eighth set of bits representing the eighth x-value $x_g$ from the first set of target bits.

The node can then aggregate the first set of target bits (or a "first set of bit-dropped x-values") including: the first subset of bits; the second subset of bits; the third subset of bits; and the fourth subset of bits.

In this example, the node: encrypts the first set of target bits into a first proof fragment in a set of proof fragments via a deterministic function (e.g., a cypher); generates the forward-propagated entry representing the first proof fragment; and stores the forward-propagated entry in the third table.

The node repeats the foregoing methods and techniques for each matching pair of entries in the second set of entries: to identify a group of initial entries—in the set of initial entries—associated with the matching pair of output entries; extracts a subset of bits, in a set of target bits, from each initial entry in the group of initial entries; encrypts the set of target bits into a proof fragment in the set of proof fragments via the deterministic function; and generates a forward-propagated entry, in the third set of entries in the third table, representing the proof fragment.

Additionally, the node can sort (e.g., in ascending order) the third set of entries in the third table according to proof fragments represented in the third set of entries.

5.3.2 Bipartite Pointers

In one implementation, the node executes the foregoing methods to generate a series of tables, each table representing a set of entries.

For example, the node generates the series of tables including: a third table representing a third set of entries; a fourth table representing a fourth set of entries; and a fifth table representing a fifth set of entries.

In this implementation, the node partitions the plot file (e.g., the series of tables in the plot file) into a set of partitions (e.g., eight partitions, 512 partitions) including: a first subset of upper partitions (e.g., four upper partitions, 256 upper partitions); and a second subset of lower partitions (e.g., four lower partitions, 256 lower partitions). Each partition in the first set of partitions: is characterized by a range of values; and contains subsets of entries in the third set of entries in the third table, the fourth set of entries in the fourth table, and/or the fifth set of entries in the fifth table within the range of values.

In another implementation, the node executes the foregoing methods and techniques to generate the third set of entries representing a set of proof fragments. Each proof fragment in the set of proof fragments is characterized by a set of bits representing (or defining) a set of pointers from a set of target entries in the fourth table. The set of bits includes: a first subset of bits (e.g., most significant bits) defining a first pointer (or a "lateral pointer") from a first target entry in the fourth table and specifying a lateral partition in which the first target entry is contained; and a second subset of bits (e.g., least significant bits) defining a second pointer (or a "crossover pointer") from a second target entry in the fourth table and specifying a crossover partition in which the second target entry is contained.

In one example, the node generates a first proof fragment characterized by a first set of bits defining: a first lateral pointer from a first target entry contained in a first lower partition in the first set of partitions; and a first crossover pointer from a second target entry contained in a second upper partition in the set of partitions.

In another example, the node generates a second proof fragment characterized by a second set of bits defining: a second lateral pointer from a third target entry contained in a first upper partition in the set of partitions; and a second crossover pointer from a fourth target entry contained in a second lower partition in the set of partitions.

In this implementation, for each proof fragment in the set of proof fragments (e.g., for each entry in the third set of entries representing the set of proof fragments), the node generates a mapping between the proof fragment (and/or the entry in the third set of entries) and the set of target entries in the fourth table according to the set of pointers.

The node repeats the foregoing methods and techniques for each entry in the fourth set of entries in the fourth table: to generate the entry characterized by a set of bits representing (or defining) a set of pointers from a set of target entries in the fifth table; and to generate a mapping between the entry and the set of target entries in the fifth table according to the set of pointers. Each target entry in the set of target entries can be contained in one partition (e.g., the same partition) in the set of partitions.

Accordingly, the node can generate each entry in the fifth table representing a binary tree extending through the series of tables. For example—in a series of tables including the third table, the fourth table, and the fifth table—the node can generate an entry in the fifth table corresponding (e.g., connecting) to two entries in the fourth table, which correspond (e.g., connect) to four entries representing four proof fragments in the third table.

Therefore, for a target entry in the fifth table, the node can generate the target entry representing a root in the binary tree and connected to a group of four proof fragments—representing sibling leaves in the binary tree—in the third table via two entries in the fourth table, thereby enabling a node to identify the group of four proof fragments from one proof fragment, in the group of four proof fragments, by traversing the binary tree.

6. Beneš Compression

Generally, the node can define a graph representing a mapping of entries in the series of tables.

More specifically, for each table in the series of tables, the node can define a set of edges—in the graph—connecting a set of entries in the table to entries in a preceding table and/or a succeeding table in the series of tables. Additionally or alternatively, for a target entry in the set of entries, the node defines the set of edges connecting a left entry in the target entry to a right entry in the target entry. Each edge in the set of edges is represented by a set of bits (e.g., $2^{32}$ bits, $2^{64}$ bits).

In one implementation, as shown in FIG. 2, for each edge in the set of edges for a table, the node: accesses a set of bits representing the edge and characterized by a first quantity of bits; and encodes the set of bits into a permutation—in a set of permutations—in a Beneš network for the table.

In this implementation, the node encodes the set of bits into the permutation characterized by a second quantity of bits falling below the first quantity of bits.

For example, the node can selectively omit bits (e.g., Waksman bits) in the set of bits according to the Beneš network to generate the permutation representing the edge.

Therefore, by encoding the set of bits representing the edge into the permutation in the Beneš network, the node can: store a compressed representation of the edge absent loss of information for reconstructing the set of bits representing the edge, thereby reducing a storage footprint (e.g., approximately 1.44 bits per entry) of the plot file.

6.1 Reordering Beneš Network

Generally, the node can generate a Beneš network including: a set of inputs; a set of switches arranged in a set of layers and representing bits; and a set of outputs.

More specifically, the node can generate the Beneš network including: a first section (e.g., a left section) representing a first subset of layers in the set of layers; a second section (e.g., a middle section) representing a second subset of layers in the set of layers; and a third section (e.g., a right section) representing a third subset of layers in the set of layers.

In one implementation, the node modifies (e.g., reorders, rearranges) switches in the first section into: a first subset of switches configured to process (or "evaluate") the first subset of layers for a first subset of inputs in the set of inputs; and a second subset of switches configured to process the first subset of layers for a second subset of inputs in the set of inputs.

For example, the node can generate a Beneš network including: a set of inputs (e.g., sixteen inputs $\{0, \ldots, 15\}$); a set of switches arranged in a set of layers (e.g., seven layers) and representing bits; and a set of outputs (e.g., sixteen outputs $\{0, \ldots, 15\}$). Each layer in the set of layers can include a group of switches in the set of switches. The Beneš network includes a first section representing a first subset of layers (e.g., three layers) in the set of layers.

In this example, the node can modify switches in the first section into: a first subset of switches configured to process the first subset of layers for a first subset of inputs (e.g., eight inputs $\{0, \ldots, 7\}$) in the set of inputs; and a second subset of switches configured to process the first subset of layers for a second subset of inputs in the set of inputs (e.g., eight inputs $\{8, \ldots, 15\}$).

In another implementation, the node: stores a first subset of bits corresponding to the first subset of switches in a first block in the data storage device; and stores a second subset of bits corresponding to the second subset of switches in a second block in the data storage device.

The node can execute the foregoing methods and techniques for the third section to modify switches in the third section into: a third subset of switches configured to process the third subset of layers for the first subset of inputs in the set of inputs; and a fourth subset of switches configured to process the third subset of layers for the second subset of inputs in the set of inputs. The node can then execute the foregoing methods and techniques for the third section: to store a third subset of bits corresponding to the third subset of switches in a third block in the data storage device; and to store a fourth subset of bits corresponding to the fourth subset of switches in a fourth block in the data storage device.

Therefore, by modifying switches in the first and third sections of the Beneš network, the node can store the Beneš network more efficiently in the data storage device, thereby enabling the node: to access more data—representing the Beneš network—per memory operation; and to reduce a total quantity of memory operations to generate a plot file and/or generate a proof of space responsive to a challenge.

Additionally or alternatively, the node can: access a first set of data representing a right section of a first Beneš network for a particular table in the series of tables; access a second set of data representing a left section of a second Beneš network for a target table in the series of tables and succeeding the particular table; and store the first set of data proximal (e.g., adjacent to) the second set of data in the data storage device.

6.2 Fanout Mapping

Generally, the node can generate a series of tables, each table representing a set of entries.

In one implementation, for a target table (e.g., a third table) in the series of tables, the node executes the foregoing methods and techniques: to generate a set of entries (e.g., forward-propagated entries generated based on entries in a preceding table); and store the set of entries in the target table.

In this implementation, the node: sorts the set of entries (e.g., in ascending order) into a set of sorted entries; and segments the set of sorted entries into a first set of sections (e.g., 64 sections). The first set of sections includes: a first subset of left sections representing left entries in the set of entries; and a second subset of right sections representing right entries in the set of entries. Each left section in the first subset of left sections corresponds to a right section in the second subset of right sections.

In another implementation, the node executes the foregoing methods and techniques: to generate a set of forward-propagated entries for a succeeding table (e.g., a fourth table) in the series of tables based on the set of entries (e.g., the set of sorted entries) in the target table; and to store the set of forward-propagated entries in the succeeding table.

In this implementation, the node: sorts the set of forward-propagated entries (e.g., in ascending order) into a set of sorted forward-propagated entries; segments the set of sorted forward-propagated entries into a second set of sections including: a third subset of left sections representing left entries in the set of sorted forward-propagated entries; and a fourth subset of right sections representing right entries in the set of sorted forward-propagated entries. Each left section in the third subset of left sections corresponds to a right section in the fourth subset of right sections.

In one implementation, the node generates a data structure representing a mapping between a first left entry in the first subset of left sections and a first right entry in the second subset of right sections.

Additionally or alternatively, the node generates a data structure representing a mapping between the first left entry—in the first subset of left sections corresponding to the target table—and a second left entry in the third subset of left sections corresponding to the succeeding table.

More specifically, the node can generate the data structure representing the mapping between the first left entry—in a first left section in the first subset of left sections—and the second left entry in a second left section in the third subset of left sections, the second left section associated with the first left section (e.g., the second left section is characterized by a fanout from the first left section).

In this implementation, the node can generate the data structure representing the mapping between the first left entry and the second left entry defining an (implicit) pointer from the second left entry to the first left entry based on a position of the second left entry in the set of sorted forward-propagated entries (e.g., within the second left section characterized by the fanout from the first left section).

Accordingly, for each entry in the set of sorted entries in the target table, the node can: generate the data structure representing a quantity of forward-propagated entries in the succeeding table corresponding to the entry (e.g., an amount of fanout for the entry); and discard a quantity of bits from a pointer between the entry and a forward-propagated entry based on the quantity of forward-propagated entries in the succeeding table corresponding to the entry.

Therefore, based on organization of the target table (e.g., the set of sorted entries) and the succeeding table (e.g., the set of sorted forward-propagated entries), the node can reduce a quantity of bits that uniquely maps an entry in the target table with a corresponding entry in the succeeding table, thereby enabling the node to further compress the data structure and reduce a footprint of the plot file.

7. Proof of Space Generation

The method S100 includes: accessing a proof-of-space challenge specifying a target range of values in Step S130; identifying an initial proof fragment, in the set of proof fragments, characterized by a value within the target range of values in Step S132; and identifying a first primary subgroup of proof fragments based on the initial proof fragment in Step S134. The subgroup of proof fragments includes: the initial proof fragment; and a pair of proof fragments, in the set of proof fragments, associated with the initial proof fragment.

The method S100 includes: generating an initial quality link, in a series of quality links, representing the first primary subgroup of proof fragments in Step S136; and generating a proof of space responsive to the proof-of-space challenge based on the series of quality links in Step S138.

Generally, in Steps S130, S132, S134, S136, and S138, in response to storing the plot file in the data storage device, the node can: access a challenge (e.g., based on a most recent block of the blockchain, based on a verifiable delay function output of a time server); and generate a proof of space—responsive to the challenge—based on the plot file. The proof of space can represent a binary tree for a set of x-values based on the plot file and responsive to the challenge.

7.1 Plot Identifier Filter

In one implementation, the node: accesses the challenge and a plot identifier associated with the node; calculates a value based on the challenge, the plot identifier, and a cryptographic hash function; and validates that the plot file is configured to generate a proof of space responsive to the challenge in response to the value exhibiting a predefined format.

For example, the node can validate that the plot file is configured to generate a proof of space responsive to the challenge in response to the value including a set of most significant bits matching a target bit pattern (e.g., the value includes nine most significant bits corresponding to zero).

7.2 Scan Filter and Quality Links

Generally, in Steps S130 and S132, the node can: access a challenge (e.g., a proof-of-space challenge) for a succeeding block (e.g., a next block) of the blockchain; and identify an initial proof fragment in the set of proof fragments based on the challenge.

In one implementation, the node: accesses the proof-of-space challenge specifying a target range of values in Step S130; and identifies the initial proof fragment, in the set of proof fragments, characterized by a first value within the target range of values in Step S132. For example, the node can identify the initial proof fragment in a first partition in the third table.

In another implementation, in Step S134, the node identifies a first subgroup of proof fragments (e.g., three proof fragments) based on the initial proof fragment. The first subgroup of proof fragments includes: the initial proof fragment; and a pair of proof fragments, in the set of proof fragments, associated with the initial proof fragment and within a second partition in the third table.

More specifically, the node can identify the first subgroup of proof fragments based on the initial proof fragment by traversing a binary tree represented in the series of tables.

For example, as shown in FIG. 3, in response to identification of the initial proof fragment represented in a first entry in the third table, the node can: identify a second entry (e.g., a first forward-propagated entry) in the fourth table and associated with the initial proof fragment; and identify a first proof fragment—in the pair of proof fragments and represented in a third entry in the third table—associated with the second entry. The second entry can fall within the second partition.

In this example, the node identifies the first proof fragment by traversing a first path in the binary tree: connecting the first entry to the second entry via a first pointer; and connecting the second entry to the third entry via a second pointer.

In response to identification of the second entry in the fourth table, the node can: identify a fourth entry (e.g., a second forward-propagated entry) in the fifth table and associated with the second entry; identify a fifth entry in the fourth table and associated with the fourth entry; and identify a second proof fragment—in the pair of proof fragments and represented in a sixth entry in the third table—associated with the fifth entry. The fourth entry, the fifth entry, and the sixth entry can fall within the second partition.

In this example, the node identifies the second proof fragment by traversing a second path in the binary tree: connecting the first entry to the second entry via the first pointer; connecting the second entry to the fourth entry via a third pointer; connecting the fourth entry to the fifth entry via a fourth pointer; and connecting the fifth entry to the sixth entry via a fifth pointer.

In another implementation, in Step S136, the node generates an initial quality link—in a set of quality links—representing the first subgroup of proof fragments.

The node executes the foregoing methods and techniques to generate additional quality links in the set of quality links based on proof fragments in the first partition and the second partition.

In one example, the node executes the foregoing methods and techniques: to identify a second proof fragment, in the set of proof fragments, characterized by a third value falling within the first partition; to identify a third subgroup of proof fragments based on the third proof fragment by traversing a path(s) of a binary tree from the first partition to the second partition; and to generate a third quality link—in the set of quality links—representing the third subgroup of proof fragments.

In another example, the node executes the foregoing methods and techniques: to identify a fourth proof fragment, in the set of proof fragments, characterized by a fourth value falling within the second partition; to identify a fourth subgroup of proof fragments based on the fourth proof fragment by traversing a path(s) of a binary tree from the second partition to the first partition; and to generate a fourth quality link—in the set of quality links—representing the fourth subgroup of proof fragments.

Therefore, the node can: identify a first target partition (e.g., the first partition) based the proof-of-space challenge; read (or load) the first partition into memory; identify the initial proof fragment within the first target partition; identify a second target partition (e.g., the second partition) based on the initial proof fragment; read (or load) the second partition into memory; and identify additional proof fragments within the second target partition and associated with the initial proof fragment in order to generate an initial quality link—in a set of quality links—representing these proof fragments. Then, the node can execute the foregoing methods and techniques to generate additional quality links in the set of quality links based on data within the first partition and the second partitions (and stored in memory) absent additional reads of other partitions into memory, thereby controlling (e.g., reducing) a quantity of reads from the storage device for generating proofs of space.

7.3 Quality Chain

In one implementation, in response to generation of the set of quality links, the node generates (or accesses) a first candidate series of quality links including the initial quality link.

In this implementation, the node: selects a first quality link from the set of quality links; and appends the first quality link to the first candidate series of quality links.

For example, the node can: generate the first candidate series of quality links consisting of the initial quality link; and generate the second candidate series of quality links by appending the second quality link initial proof fragment.

In another implementation, the node: generates a filter based on a cryptographic hash of the first candidate series of quality links; and generates a filter value based on a cryptographic hash of the second candidate series of quality links.

In response to detection of the filter value failing to pass the filter, the node discards the second candidate series of quality links. The node can then repeat the foregoing methods and techniques: to select a different quality link from the set of quality links; to generate a new candidate series of quality links by appending the different quality link to the first candidate series of quality links (e.g., by appending a third quality link to the initial quality link); and to generate a new filter value based on a cryptographic hash of the new candidate series of quality links.

Alternatively, in response to detection of the filter value passing the filter, the node executes the foregoing methods and techniques: to select an additional quality link from the set of quality links; and to generate a third candidate series of quality links by appending the additional quality link to the second candidate series of quality links. The node then executes the foregoing methods and techniques: to generate a second filter based on a cryptographic hash of the second candidate series of quality links; and to generate a second filter value based on a cryptographic hash of the third candidate series of quality links.

In response to detection of the second filter value passing the second filter, the node repeats the foregoing methods and techniques to iteratively: select an additional quality link from the set of quality links; and to generate a succeeding candidate series of quality links by appending the additional quality link to a preceding candidate series of quality links associated with a filter value that passes a corresponding filter.

More specifically, the node can repeat the foregoing methods and techniques to generate a final candidate series of quality links (or a "quality chain"): characterized by a threshold quantity of quality links (e.g., sixteen quality links); and representing a proof of space.

In response to detection of the final candidate series of quality links characterized by the threshold quantity of quality links, the node: calculates a quality characterizing the proof of space based on the final candidate series of quality links; and, in response to detection of the quality exceeding a threshold quality (e.g., based on the succeeding block, based on a preceding block), identifies the final candidate series of quality links as corresponding to a valid proof of space.

The node can then generate the proof of space based on a series of quality links including the final candidate series of quality links (hereinafter "the series of quality links") as described below.

7.3 Proof Fragment Retrieval

Generally, in response to identification of the series of quality links as corresponding to a valid proof of space, the node can access an additional proof fragment in the set of proof fragments for each quality link in the series of quality links.

In one implementation, the node accesses the series of quality links including the initial quality link representing the first subgroup of proof fragments.

For example, the first subgroup of proof fragments can include: the initial proof fragment in the first partition; the first proof fragment in the second partition; and the second proof fragment in the second partition.

In this implementation, the node identifies a fourth proof fragment in the set of proof fragments associated with the first subgroup of proof fragments by traversing a binary tree represented in the series of tables.

For example, in response to identification of the initial proof fragment represented in the first entry in the third table, the node can execute the foregoing methods and techniques: to identify the second entry in the fourth table and associated with the initial proof fragment; to identify the fourth entry in the fifth table and associated with the second entry; to identify the fifth entry in the fourth table and associated with the fourth entry; and to identify the fourth proof fragment—represented in a seventh entry in the third table—associated with the fifth entry. The seventh entry can fall within a third partition.

In this example, the node identifies the first proof fragment by traversing a path in the binary tree: connecting the first entry to the second entry via the first pointer; connecting the second entry to the fourth entry via the third pointer; connecting the fourth entry to the fifth entry via the fourth pointer; and connecting the fifth entry to the seventh entry via a sixth pointer.

Accordingly, the node can: retrieve the fourth proof fragment in the third partition and associated with the first quality link; and aggregate the first subgroup of proof fragments and the fourth proof fragments—into a first group of proof fragments associated with the first quality link—in order to reconstruct x-values for generating the proof of space.

Therefore, by retrieving the fourth proof fragment in response to identification of the series of quality links as corresponding to a valid proof of space, the node can defer reading the third partition into memory until confirmation that the series of quality links corresponds to the valid proof of space, thereby controlling a quantity of reads (e.g., reducing a quantity of unnecessary reads) from the storage device for generating proofs of space.

The node repeats the foregoing methods and techniques for each quality link in the series of quality links: to identify and retrieve an additional proof fragment, in the set of proof fragments, associated with a subgroup of proof fragments in the quality link; and to aggregate the subgroup of proof fragments and the additional proof fragment into a group of proof fragments associated with the quality link.

Therefore, for a series of quality links characterized by the threshold quantity of quality links (e.g., sixteen quality links), the node can access (or retrieve) a group of proof fragments (e.g., four proof fragments) for each quality link in the series of quality links in order to yield a collection (or sequence) of proof fragments (e.g., 64 proof fragments) for reconstructing the set of x-values and generating the proof of space.

7.4 X-Value Reconstruction and Proof Generation

Generally, in Steps S136 and S138, the node can execute the foregoing methods and techniques: to generate a series of quality links; and to aggregate a group of proof fragments for each quality link in the series of quality links. For each proof fragment in the group of proof fragments, the node can: decrypt the proof fragment into a set of target bits (e.g., a "set of bit-dropped x-values"); and compute (e.g., recompute, expand) a subset of x-values—in a set of x-values and represented in initial entries in the set of initial entries—based on the set of target bits. The node can then generate the proof of space based on the set of x-values.

In one implementation, in response to generation of the series of quality links including the initial quality link representing the initial proof fragment, the node: decrypts the initial proof fragment into a first set of target bits; and computes a first subset of x-values in the set of x-values based on the first set of target bits.

In this implementation, for each proof fragment represented in the initial quality link, the node repeats the foregoing methods and techniques: to decrypt the proof fragment into a set of target bits; and to compute a subset of x-values in the set of x-values based on the set of target bits.

The node repeats the foregoing methods and techniques for each quality link in the series of quality links: to decrypt proof fragments—represented in the quality link—into sets of target bits; and to compute subsets of x-values in the set of x-values based on these sets of target bits.

For example, the node can generate the series of quality links including: a first quality link representing a first proof fragment; and a second quality link representing a second proof fragment.

In this example, the node can: decrypt the first proof fragment into a second set of target bits; and decrypt the second proof fragment into a third set of target bits. The node can then compute the set of x-values including: a second subset of x-values based on the second set of target bits; and a third subset of x-values based on the third set of target bits.

In another implementation, in Step S138, the node generates the proof of space based on the set of x-values.

Therefore, the node can defer reconstruction of decrypted proof fragments into x-values until confirmation that the series of quality links corresponds to the valid proof of space, thereby: controlling computation costs and/or energy costs for generating proofs of space; and/or reducing instances of unnecessary computation for quality chains that fail to correspond to valid proofs of space.

8. Block Generation and Broadcast

In one implementation, the node generates a new block for the blockchain based on the proof of space; and broadcasts the new block to a distributed network, such as described in U.S. patent application Ser. No. 17/320,114, filed on 13 May 2021, which is incorporated in its entirety by this reference.

More specifically, the node can generate the new block after: validating that the plot file is configured to generate the proof of space responsive to the challenge; and validating that the quality characterizing the proof of space exceeds the threshold quality.

9. Disclaimers

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
generating a first set of entries based on a set of initial entries in a first table via a first deterministic function and a seed value;
identifying a first matching pair of entries in the first set of entries;
generating a first forward-propagated entry in a second set of entries in a second table based on the first matching pair of entries;
identifying a second matching pair of entries in the second set of entries;
identifying a group of initial entries, in the set of initial entries, associated with the second matching pair of entries;
extracting a subset of bits, in a set of target bits, from each initial entry in the group of initial entries;
generating a second forward-propagated entry in a third set of entries in a third table by encrypting the set of target bits, the second forward-propagated entry representing a first proof fragment in a set of proof fragments;
generating a plot file representing a set of tables comprising the third table;
storing the plot file in a storage device;
accessing a proof-of-space challenge; and
generating a proof of space based on the proof-of-space challenge and the set of proof fragments in the plot file.

2. The method of claim 1:
wherein identifying the group of initial entries comprises identifying the group of initial entries comprising:
a first initial entry representing a first value and a second value; and
a second initial entry representing a third value and a fourth value; and
wherein extracting the subset of bits, in the set of target bits, from each initial entry in the group of initial entries comprises:
extracting a first subset of bits from a first set of bits representing the first value;
extracting a second subset of bits from a third set of bits representing the third value; and
aggregating the set of target bits comprising the first subset of bits and the second subset of bits.

3. The method of claim 2:
wherein extracting the first subset of bits from each initial entry in the group of initial entries comprises:
extracting the first subset of bits representing a first match index for the first value; and
excluding a third subset of bits, in the first set of bits, from the set of target bits; and
wherein extracting the second subset of bits from each initial entry in the group of initial entries comprises:
extracting the second subset of bits representing a second match index for the third value; and
excluding a fourth subset of bits, in the third set of bits, from the set of target bits.

4. The method of claim 1:
wherein accessing the proof-of-space challenge comprises accessing the proof-of-space challenge specifying a target range of values;
further comprising:
identifying an initial proof fragment, in the set of proof fragments, characterized by a first value within the target range of values in a first partition in the plot file;
identifying a first subgroup of proof fragments based on the initial proof fragment, the first subgroup of proof fragments comprising:
the initial proof fragment; and
a pair of proof fragments, in the set of proof fragments, associated with the initial proof fragment and within a second partition in the plot file; and
generating an initial quality link, in a series of quality links, representing the first subgroup of proof fragments; and
wherein generating the proof of space comprises generating the proof of space responsive to the proof-of-space challenge based on the series of quality links.

5. The method of claim 4, wherein identifying the first subgroup of proof fragments comprises:
identifying a third forward-propagated entry, in a fourth table in the set of tables, associated with the initial proof fragment;
identifying a fourth forward-propagated entry, in a fifth table in the set of tables, associated with the third forward-propagated entry;
identifying a second proof fragment, in the pair of proof fragments, associated with the third forward-propagated entry; and
identifying a third proof fragment, in the pair of proof fragments, associated with the fourth forward-propagated entry.

6. The method of claim 4, wherein generating the proof of space comprises:
identifying a second proof fragment, in the set of proof fragments, characterized by a second value in the first partition;
identifying a second subgroup of proof fragments based on the second proof fragment;
generating a second quality link representing the second subgroup of proof fragments;
accessing a first candidate series of quality links comprising the initial quality link;
generating a second candidate series of quality links by appending the second quality link to the first candidate series of quality links;
generating a filter based on a cryptographic hash of the first candidate series of quality links;
generating a filter value based on a cryptographic hash of the second candidate series of quality links; and
in response to detection of the filter value passing the filter, generating the proof of space based on the series of quality links comprising the second candidate series of quality links.

7. The method of claim 4, wherein generating the proof of space comprises:
accessing the series of quality links comprising a first quality link representing a second subgroup of proof fragments;
identifying a second proof fragment in the set of proof fragments associated with the second subgroup of proof fragments by traversing a binary tree represented in the set of tables; and generating the proof of space based on the second proof fragment.

8. The method of claim 4, wherein generating proof of space comprises:

in response to generation of the series of quality links comprising a first quality link representing the first proof fragment, decrypting the first proof fragment into the set of target bits;

computing a subset of values, in a set of values and represented in initial entries in the set of initial entries, based on the set of target bits; and generating the proof of space representing the set of values.

9. The method of claim 1:

wherein identifying the first matching pair of entries comprises:

generating a first set of entry buckets based on a first subset of entries in the first set of entries;

generating a set of match buckets for entries in the first subset of entries;

identifying a first match between a target entry bucket, in the first set of entry buckets, and a target match bucket in the set of match buckets; and identifying the first matching pair of entries comprising:

a first entry associated with the target entry bucket; and a second entry associated with the target match bucket; and wherein generating the first forward-propagated entry comprises:

identifying a first initial entry in the set of initial entries and corresponding to the first entry;

identifying a second initial entry in the set of initial entries and corresponding to the second entry; and generating the first forward-propagated entry based on the first initial entry and the second initial entry.

10. The method of claim 9:

wherein generating the first set of entry buckets comprises:

segmenting the first set of entries into a set of sections comprising a first section representing the first subset of entries; and generating the first set of entry buckets based on the first subset of entries, each entry in the first subset of entries characterized by a quantity of match index bits; and wherein generating the set of match buckets comprises, for each entry in the first subset of entries, generating a subset of match buckets in the set of match buckets for the entry based on the quantity of match index bits.

11. The method of claim 1, wherein generating the second forward-propagated entry comprises:

generating the second forward-propagated entry representing the first proof fragment characterized by a first set of bits defining a set of pointers comprising:

a first pointer from a first target entry, in a set of target entries, contained in a first partition in the plot file; and a second pointer from a second target entry, in the set of target entries, contained in a second partition in the plot file; and generating a mapping between the second forward-propagated entry and the set of target entries in the fourth table according to the set of pointers.

12. The method of claim 11, wherein generating the second forward-propagated entry comprises generating the second forward-propagated entry representing the first proof fragment characterized by the first set of bits comprising:

a first subset of bits defining the first pointer from the first target entry contained in the first partition in a set of upper partitions; and a second subset of bits defining the second pointer from the second target entry contained in the second partition in a set of lower partitions.

13. The method of claim 1, wherein generating the plot file comprises:

defining a set of edges connecting the third set of entries in the third table to a fourth set of entries in a fourth table in the set of tables; and for each edge in the set of edges:

accessing a set of bits representing the edge and characterized by a first quantity of bits; and encoding the set of bits into a permutation representing the edge in a Beneš network for the fourth table, the permutation characterized by a second quantity of bits falling below the first quantity of bits.

14. The method of claim 13, wherein encoding the set of bits comprises:

identifying a subset of Waksman bits in the set of bits; and selectively omitting the subset of Waksman bits in the set of bits according to the Beneš network to generate the permutation representing the edge.

15. The method of claim 13, wherein generating the plot file comprises:

generating the Beneš network comprising:

a set of inputs; and a set of switches arranged in a set of layers and representing bits, the set of switches comprising:

a first section representing a first subset of layers in the set of layers;

a second section representing a second subset of layers in the set of layers; and a third section representing a third subset of layers in the set of layers; and rearranging switches in the first section into:

a first subset of switches configured process the first subset of layers for a first subset of inputs in the set of inputs; and a second subset of switches configured to process the first subset of layers for a second subset of inputs in the set of inputs;

storing a first subset of bits corresponding to the first subset of switches in a first block in the data storage device; and storing a second subset of bits corresponding to the second subset of switches in a second block in the data storage device.

16. A method comprising:

generating a first set of entries based on a set of initial entries in a first table via a first deterministic function and a seed value;

identifying a first matching pair of entries in the first set of entries;

generating a first forward-propagated entry in a second set of entries in a second table based on the first matching pair of entries;

identifying a second matching pair of entries in the second set of entries;

identifying a group of initial entries, in the set of initial entries, associated with the second matching pair of entries;

extracting a subset of bits, in a set of target bits, from each initial entry in the group of initial entries;

generating a second forward-propagated entry in a third set of entries in a third table by encrypting the set of target bits, the second forward-propagated entry representing a first proof fragment in a set of proof fragments;

generating a plot file representing a set of tables comprising the third table;

accessing a proof-of-space challenge specifying a target range of values;

identifying an initial proof fragment, in the set of proof fragments, characterized by a value within the target range of values;

identifying a first subgroup of proof fragments based on the initial proof fragment, the subgroup of proof fragments comprising:

the initial proof fragment; and a pair of proof fragments, in the set of proof fragments, associated with the initial proof fragment;

generating an initial quality link, in a series of quality links, representing the first subgroup of proof fragments; and generating a proof of space responsive to the proof-of-space challenge based on the series of quality links.

17. The method of claim 16, wherein generating the proof of space comprises:

identifying a second proof fragment, in the set of proof fragments, characterized by a second value in the first partition in the plot file;

identifying a second subgroup of proof fragments based on the second proof fragment;

generating a second quality link representing the second subgroup of proof fragments;

accessing a first candidate series of quality links comprising the initial quality link;

generating a second candidate series of quality links by appending the second quality link to the first candidate series of quality links; and generating the proof of space based on the series of quality links comprising the second candidate series of quality links.

18. The method of claim 16, wherein generating the proof of space comprises:

accessing the series of quality links comprising a first quality link representing a second subgroup of proof fragments comprising the first proof fragment;

identifying a second proof fragment in the set of proof fragments associated with the second subgroup of proof fragments by traversing a binary tree represented in the set of tables;

decrypting the first proof fragment into the set of target bits;

decrypting the second proof fragment into a second set of target bits;

computing a set of values, represented in initial entries in the set of initial entries, based on:

the set of target bits; and the second set of target bits; and generating the proof of space representing the set of values.

19. A method comprising:

generating a first set of entries based on a set of initial entries in a first table via a first deterministic function and a seed value;

identifying a first matching pair of entries in the first set of entries;

generating a first forward-propagated entry in a second set of entries in a second table based on the first matching pair of entries;

identifying a second matching pair of entries in the second set of entries;

identifying a group of initial entries, in the set of initial entries, associated with the second matching pair of entries;

extracting a subset of bits, in a set of target bits, from each initial entry in the group of initial entries;

generating a second forward-propagated entry in a third set of entries in a third table by encrypting the set of target bits, the second forward-propagated entry representing a first proof fragment in a set of proof fragments;

generating a plot file representing a set of tables comprising the third table; and storing the plot file in a storage device.

20. The method of claim 19, further comprising:

accessing a proof-of-space challenge specifying a target range of values;

identifying an initial proof fragment, in the set of proof fragments, characterized by a value within the target range of values;

identifying a subgroup of proof fragments based on the initial proof fragment;

generating an initial quality link, in a series of quality links, representing the subgroup of proof fragments; and generating a proof of space responsive to the proof-of-space challenge based on the series of quality links.

* * * * *